United States Patent Office 3,699,064
Patented Oct. 17, 1972

3,699,064
CARBOXYLIC CURING AGENT
Arthur L. Cunningham, Park Forest, Ill., assignor to The Sherwin-Williams Company, Cleveland, Ohio
No Drawing. Filed Dec. 14, 1970, Ser. No. 98,183
Int. Cl. C08f 21/04
U.S. Cl. 260—22 EP                     10 Claims

ABSTRACT OF THE DISCLOSURE

A polycarboxylic curing agent soluble in paraffinic hydrocarbon solvents, particularly suitable as curing agents for epoxide resins, obtained by simultaneously reacting a polyol having from 3 to about 6 hydroxyl groups with a cyclic acid anhydride, and an olefin oxide with at least 10 serially linked carbon atoms having an oxirane functionality of from 1 to about 1.5.

BACKGROUND OF THE INVENTION

Epoxy resin coating systems are currently used in numerous applications where chemical resistance is desired. Such coatings are particularly known for their hardness and durability in numerous demanding applications. Popular epoxide coatings utilize epoxides derived from vegetable, marine, and animal oils which have been epoxidized. Polycarboxylic curing agents for epoxide resins are disclosed in U.S. Pats. Nos. 3,050,480; 3,218,274; 3,397,255 and 3,408,215. However, these partial esters require aromatic solvents or oxygenated solvents, such as ketones, esters, ether esters or their equivalent, or both, to form clear, homogeneous solutions. These solvents are undesirable for coatings which are used in residential areas or in industrial areas where the noxious aromatic solvent fumes are toxic to humans, as well as being a fire hazard. Particularly where an epoxide coating is to be applied in relatively close quarters it is imperative that the solvent used be reasonably tolerable and harmless. As of this time, a curing agent for epoxy resins which is essentially completely soluble in aliphatic hydrocarbon solvents and which performs competitively with those soluble in aromatic or oxygenated solvents is not available. The instant invention provides such a curing agent.

Aliphatic solubility of a curing agent is defined as: a solution of the curing agent at 60 percent solids concentration in a solvent blend of 37 parts V.M.+P.[1] naphtha to 25 parts epoxy ethyl ethoxyethyl acetate can be diluted with at least ten (10) times its volume of additional V.M.+P. naphtha without evidence of cloudiness. Such a resin solution is said to have 1000 percent V.M.+P. tolerance and is considered to be "aliphatic soluble." The variation in solids content may range from 50 to 70 percent without substantially affecting the accuracy of the definition because the "solids" variation is so small in relation to the volumes of solvent used as to be insignificant.

Carboxyl functional polyesters may be prepared which can be diluted in paraffinic hydrocarbon solvents to a limited extent by esterifying the polyol used with a fatty acid. For example, commercially available polyesters contain a mol of pentaerythritol which is esterified with approximately 0.65 mol of a coconut-type fatty acid and the partial ester prepared therefrom by reacting the resultant condensate with approximately 3.35 mols of chlorendic anhydride (hexachloro endomethylene tetrahydrophthalic anhydride), or its equivalent. However, the limited aliphatic solubility obtained in this manner is vitiated by the very slow drying rate of the final system.

---
[1] V.M.+P. is Varnish Makers and Painters.

U.S. Pat. No. 3,408,215 discloses a storage stable solution comprising a carboxyl-terminated ester prepared from a polyol, a non-halogenated polycarboxylic acid containing 2 to about 12 carbon atoms, preferably a mononuclear cyclic polycarboxylic acid having 6 cyclic carbon atoms, and a halogenated polycarboxylic acid containing about 3 to about 12 carbon atoms, preferably a cyclic polycarboxylic acid having at least 6 cyclic carbon atoms, said non-halogenated polycarboxylic acid being present in a ratio of mols of acid to equivalents of polyol of about 0.05:1 to about 0.75:1, said halogenated polycarboxylic acid being present in such quantity as to have a ratio of total mols of acid to equivalents of polyol of about 0.6:1 to about 1.2:1, wherein any non-halogenated polycarboxylic acid which is initially unreacted with the polyol, or later becomes displaced from said polyol, is at least partly esterified with an aliphatic diol having 2 to 10 carbon atoms. The ester is preferably prepared by having the halogenated polycarboxylic acid present as about 20 mol percent to about 90 mol percent of the total acid present.

The Wismer reference states that the process may also be carried out in the presence of a suitable solvent, including petroleum naphtha, higher boiling aliphatic solvents, i.e., those boiling above 130° C., in addition to various aromatic solvents. Though preparation of a curing agent is disclosed in an aliphatic hydrocarbon solvent, the function of the aliphatic hydrocarbon is not that of a solvent at all, but that of an inert liquid medium in which the reaction may be carried. More particularly, not that the carboxyl-terminated esters which may be used as curing agents for epoxidized drying oils are specifically disclosed as being soluble in only aromatic solvents.

Further, the partial ester disclosed by Wismer is unstable and, upon aging, free phthalic acid has a tendency to precipitate out. Therefore, after preparation of the polyester, a glycol, such as ethylene glycol, is added and held at a temperature somewhat below esterification temperature, to scavenge free phthalic anhydride and thus stabilize the partial ester. This problem is tacitly implied in the statement wherein Wismer admits: "When tetrahydrophthalic and hexahydrophthalic acids are used as the non-halogenated acids in the preparation of the carboxyl terminated esters of this invention, no precipitation from solution occurs; however, the treatment with diols improves the pot-life of epoxidized oil resins which have been catalyzed with carboxyl terminated esters of such acids" (column 4, lines 16–22).

Wismer states that, "While it is preferred to add the diol at the conclusion of the esterification reaction, the novel process can also be practiced by adding the diol during or before the initial esterification step" (column 3, lines 39–43). The fact is that addition of the diol during or before the initial esterification step will interfere with the partial esterification process. In any event, assuming that the diol was reacted into the carboxylic curing agent as a result of esterification of both hydroxyls, it will be seen from Example 5 hereinafter that the product obtained is completely insoluble in an aliphatic hydrocarbon solvent (V.M.+P. naphtha). By contrast, it will be noted that the carboxyl functional condensate obtained in the instant invention permits tightly controllable molecular weight, weight and viscosity, yet is fully soluble in an aliphatic hydrocarbon solvent, which solubility is critically dependent upon the fact that there are at least 10 serially linked carbon atoms in a single oxirane ring-containing epoxidized compound optionally interrupted by oxygen atoms, which is reacted to form said condensate.

U.S. Pat. No. 3,397,255 discloses alkyd resin which are obtainable by the reaction of 15–60% by weight of the total resin components of a polycarboxylic acid, 10–45% by weight of the total resin components of a polyhydric alcohol, and 10–70% by weight of the total resin components of an epoxide containing component consisting essentially of an epoxy-alkane containing 8–26 carbon atoms. The resin is prepared by simultaneously reacting all three components at a temperature in the range from 120° to 270° C. It will be noted that in the instant invention the amount of polycarboxylic anhydride used in the formulation is invariably in excess of 60% by weight of the total composition. In addition, as will be demonstrated hereinafter, resins prepared as disclosed in Examples 1 and 2 of the instant U.S. patent, through soluble in paraffinic solvents, will not cure the resin in any practical period of time, since even the highest acid number obtained is far too low.

SUMMARY OF THE INVENTION

It has been discovered that a polycarboxyl functional polyester characterized by essentially total solubility in paraffinic hydrocarbon solvents may be prepared from a polyol having from 3 to 6 hydroxyl groups, a cyclic dicarboxylic acid anhydride containing 8 to about 14 carbon atoms, preferably a mononuclear cyclic anhydride having 6 cyclic carbon atoms, and an epoxy compound containing from about 1 to about 1.5 oxirane rings and having at least 10 serially linked carbon atoms per molecule.

It has been discovered more specifically that a polyol having from about 3 to about 6 hydroxyl groups may be esterified by an aromatic dicarboxylic anhydride having 6 cyclic carbon atoms which partial polyester may be reacted with an aliphatic epoxy resin having essentially a single oxirane ring in a straight chain of from about 13 to about 20 carbon atoms, and that the resulting product of tightly controllable molecular weight is essentially fully soluble in hydrocarbon aliphatic solvents.

PREFERRED EMBODIMENT OF THE INVENTION

In a preferred embodiment of the instant invention, the carboxyl-terminated ester always contains about 0.9 to about 1.3 mols of a cyclic acid anhydride per hydroxyl equivalent of polyol, to form a partial ester. The cyclic acid anhydride may be non-halogenated or halogenated, or a mixture of the two, and may include, additionally, a minor quantity of free carboxyl groups. If only non-halogenated dicarboxylic acid anhydrides are employed, an acid catalyst, such as phosphoric acid, is required for room temperature curing. This partial ester is then reacted with an alpha olefin oxide having at least 10 carbon atoms, and preferably less than 25 carbon atoms. Addition of the alpha olefin oxide into the ester generates a hydroxyl group on the beta carbon atom of the alpha olefin oxide residue, which in turn is reacted with a further quantity of cyclic acid anhydride to form the polycarboxyl curing agent of the instant invention. Epoxidized octyl tallate may be used instead of or in conjunction with the alpha olefin oxide. It is imperative that the anhydride be used since the acid will not provide the reaction which gives rise to the structure which is essential for aliphatic solubility. The preferred molar range of dicarboxylic anhydride to equivalents of polyol to oxirane equivalents of epoxidized material is in the range from about 1.15:1.00:0.15 to about 1.50:1.00:0.5, depending upon the particular polyols and dicarboxylic anhydrides used.

Preferred cyclic acid anhydrides are dicarboxylic acid anhydrides, which are well known in the art. By the term "dicarboxylic" is meant that two carboxy groups would be generated by the dicarboxylic acid anhydride in its hydrous form. For example, one mol of chlorendic anhydride contains 2 carboxy equivalents. Other acid anhydrides usable as major ingredients are phthalic, hydrogenated phthalic, endomethylene or lower alkyl-substituted derivatives thereof, naphthenic 2,11 dicarboxylic anhydride and halogenated derivatives thereof. Within the temperature range of the instant process the dicarboxylic acid anhydride, which is often a semi-solid or solid at room temperature, is easily reacted into the mass. The resins of the instant invention are preferably made from mixtures containing from about 0.75 to about 1.25, and preferably 1.0 mole, of dicarboxylic acid anhydride in excess of the equivalents of hydroxyl provided by the polyol per equivalent of oxirane (epoxy). It is most preferred to make curing agents from curable mixtures which contain from about 0.9 to about 1.0 mole of dicarboxylic anhydride in excess of the hydroxyl equivalents theoretically provided by the oxirane ring. Only the dibasic anhydrides are of use in the instant invention because at the temperature conditions of the instant process, the dibasic acids would not react.

It will be apparent that the aliphatic solubility, rate of cure to dryness and other properties of resinous film will depend upon the particular choice of dibasic anhydride used, the particular ratios in which it is used with the other ingredients, and the particular choice of other ingredients. Chlorendic anhydride is preferred because it is theorized that: (a) its cyclic structure contributes to film hardness and quick drying; (b) the chlorine content increases the ionization constant of the residual carboxyl emanating from it in the partial ester moiety, which increases the rate of the cross linking reaction (non-halogenated acids will not cure at room temperature at practical rates unless a catalyst is used); and (c) the alicyclic, halogenated structure appears to be relatively easy to solubilize. Depending upon the particular characteristics desired in the end product and the economics applicable to that product, it might be desirable to blend chlorendic anhydride with phthalic, tetrahydrophthalic or substituted dibasic anhydrides. Even acids such as trimellitic anhydride or naphthenic-2,11 dicarboxylic anhydride and their halogenated derivatives might be used in small amounts along with most open chain cyclic anhydrides, such as maleic, succinic, and their alkyl-substituted or halogenated derivatives, provided the amounts used are small.

It will be appreciated that the hydroxyl functionality of the polyol is determined by the carboxyl functionality of the curing agent that is ultimately required. Though compounds containing less than 3 hydroxyl groups may be substituted in the instant invention, the properties obtained therefrom are inferior to those utilizing compounds containing from about 3 to about 6 hydroxyl groups. Particularly useful are glycerol, trimethylol methane, trimethylol propane, pentaerythritol, pentaglycerol, dipentaerythritol, and the like and higher polyols, as for example those made by the condensation of styrene with allyl alcohol.

Epoxide or epoxy resins are well known to the art. The term "epoxide" is generic to resins containing epoxide, oxirane or glycidyl groups. The epoxide compounds useful in the instant invention are those which have an epoxy functionality of about 1 to about 1.5 and which have at least 10 serially linked carbon atoms.

The oxirane ring may be present intermediate a molecule rather than terminally. Such epoxides are available by the epoxidation of an olefin by known methods; in particular, a compound such as one denoted by R—HC=CH—R' wherein R and R' each contain sufficient carbon atoms to total at least eleven carbon atoms may be epoxidized with peracetic acid to form an epoxidized olefin which contains at least 13 carbon atoms and acetic acid.

The novel method for preparing the aliphatic hydrocarbon-soluble carboxyl functional curing agent of the instant invention involves the following steps:

(1) Heating a mixture of a polyol, a cyclic acid anhydride, and an oxirane ring containing compound containing from about 10 to about 24 serially linked carbon atoms at a temperature in the range from about 120° to about 200° C., and preferably from about 140° to about 160° C., at about atmospheric pressure, in a molar ratio of equivalents of hydroxyl:mols of dicarboxylic anhydride:mols of epoxide in the range from about 1:1.15:0.15 to about 1:1.41:0.4, heating them simultaneously in a reaction vessel until a compound with the desired molecular weight and physical characteristics is reached, or (2) Heating the dicarboxylic acid with a predetermined amount of polyol in the ratio of from about 1.15 to about 1.4 moles of cyclic anhydride per equivalent of hydroxyl provided by the polyol, and after partial esterification of the polyol is complete, the oxirane ring compound is added to the mixture in sufficient quantity so as to provide a ratio of equivalents of oxirane to excess anhydride functional equivalents from 0.75 to about 1.25 per equivalent of hydroxyl, then heating the mixture at a temperature in the range from about 120° to 180° C. at about atmospheric pressure, for a period of time sufficient to react substantially all of the oxirane ring-containing compound with the partial ester so as to generate a hydroxyl group on the beta carbon atom of the oxirane ring compound residue, and thereafter further reacting the condensate with an additional quantity of a cyclic acid anhydride which optionally may be a halogenated cyclic acid anhydride, so as to react with at least one of said free hydroxyl groups, adding further carboxyl functionality to the condensate.

The instant process may be carried out in the presence of solvents, or in the presence of a substantially inert liquid medium, or with no extraneous liquid phase other than the reactants themselves. It will be noted that aliphatic hydrocarbon solvents will disperse both the polycarboxylic acids and the polyols, but will not dissolve the partial ester. In the following examples, all parts are by weight unless otherwise specified.

Example 1

Into a five liter glass flask fitted with a thermometer an agitator, a reflux condenser, and an inert gas tube were charged 1854 parts hexachloro endomethylene tetrahydrophthalic anhydride, 136 parts pentaerythritol and 254 parts of an epoxidized 15 to 18 carbon length alpha olefin oxide (Nedox 1518-made by Ashland Oil). 300 parts of Cellosolve Acetate (R) were added to slurry the reactants. A nitrogen cover was provided, and the temperature was brought to 182° C., whereupon a clear melt was formed. Aliphatic V.M.+P. solvent was added to bring the non-volatile solids to 62.2% by weight. The resultant solution had a Gardner color of 3, a Gardner-Holdt viscosity of J, and an acid value of 122, as determined by titration using alcohol-free reagent.

Example 2

The procedure of Example 1 was repeated, except that the amounts of reactants were 1966 parts of hexachloro endomethylene tetrahydrophthalic anhydride, 136 parts of pentaerythritol and 330 parts of a 15–18 carbon chain length epoxidized alpha olefin oxide. The top temperature reached during the reaction was 270° F. The partial ester formed was reduced to 61% solids in V.M.+P. aliphatic solution to give a clear, homogeneous solution. The final solution had a Gardner color of 1–2, a Gardner-Holdt viscosity of T, and an acid value of 156, as determined by titration using alcohol-free reagent.

Example 3

The procedure of Example 1 is repeated, except that the amounts of reactants are 2002 parts hexachloro endomethylene tetrahydrophthalic anhydride, 136.8 parts pentaerythritol, and 300 parts of a glycidyl ester of a branched tertiary carboxylic acid such as Cardura E made by Shell Oil Company. The resultant carboxyl condensate had a Gardner-Holdt viscosity of 16 at 66% NVM in V.M.+P. Naphtha.

Example 4

The procedure of Example 1 is repeated, except that the amounts of reactants are 2076 parts hexachloro endomethylene tetrahydrophthalic anhydride, 136.8 parts pentaerythritol, and 388 parts of a glycidyl ester of a branched tertiary carboxylic acid such as Cardura E made by Shell Oil Company. The resultant carboxylic condensate had a Gardner-Holdt viscosity of 12 at 67% NVM in V.M.+P. Naphtha.

Example 5

The procedure of Example 1 hereinabove is repeated, except that the amount of reactants are 1650 parts chlorendic anhydride, 136 parts pentaerythritol, and 330 parts epoxidized octyl tallate (Flexol EP-8 made by Union Carbide Corporation). The resultant carboxyl condensate had a Gardner-Holdt viscosity of C-D at 58% NVM in V.M.+P. Naphtha and a Gardner color of 5+.

TABLE I.—DATA ON ALIPHATIC-SOLUBLE CURING AGENTS

| Example | Constituents | Weight percent | Ratio [1] of $E_{OH}/M_A/M_E$ | Acid value Theoretical | Acid value Actual | Non-volatile material (NVM) | Viscosity (G-H) |
|---|---|---|---|---|---|---|---|
| 1 | Penta E [2] | 6.0 | 1/1.25/0.25 | 100 | 121 | 62 | J+ |
|   | Chlorendic | 68.6 | | | | | |
|   | C$_{15-18}$ Alpha-O | 11.4 | | | | | |
| 2 | Penta E [2] | | 1/1.32/0.32 | 90 | 156 | 61 | T |
|   | Chlorendic | | | | | | |
|   | C$_{15-18}$ Alpha-O | | | | | | |
| 3 | Penta E [2] | 5.6 | 1/1.35/0.31 | 90 | 89 | 66 | 12 |
|   | Chlorendic | 82.1 | | | | | |
|   | Cardura E | 12.4 | | | | | |
| 4 | Penta E [2] | 5.3 | 1/1.41/0.40 | | 84 | 67 | 56 |
|   | Chlorendic | 79.7 | | | | | |
|   | Cardura E | 14.9 | | | | | |
| 5 | Penta E [2] | 6.4 | 1/1.25/0.25 | ([3]) | ([3]) | 58 | C-D |
|   | Chlorendic | 77.9 | | | | | |
|   | Epoxide octyl tallate | 15.6 | | | | | |

[1] $E_{OH}/M_A/M_E$ = Equivalents hydroxyl/mols dibasic anhydride/mols epoxide.
[2] Penta E = Pentaerythritol.
[3] Not determined.

The following table enumerates particular physical characteristics of the resinous films made from the curing agents of Examples 2 and 3 when used in 40/60 ratio of carboxyl curing agent/modified epoxidized soya oil. The films were cast on steel panels with a 3-mil drawdown.

TABLE II

| Example | 2 | 3 |
|---|---|---|
| Weight catalyst (10% o-$H_3PO_4$ in MEK) parts | 3 | 3 |
| Sward hardness (16 hours) | 11 | 19 |
| Color rating, intense UV | 7 | 7 |
| Taber abrasion | 95 | 71 |
| Reverse impact (in.-lbs. reverse) | 160 | 45 |
| Zapon dry, hours | 2.116 | 0.833 |
| Gel time, hours | 1.368 | 2.25 |

Example 6[1]

A stable ester curing agent was prepared from the following ingredients:

Phthalic anhydride: 133 grams (0.9 mol).
Pentaerythritol: 68 grams (0.5 mol).
Chlorendic acid: 389 grams (1 mol).
Solvent (Solvesso 100): 50 ml.

The phthalic anhydride, pentaerythritol, and solvent were admixed in a reaction vessel equipped with a stirrer, reflux condenser, temperature measuring device, inert gas sparger tube, and a moisture trap. The admixture was heated to about 150° C., at which temperature about one-third of the chlorendic acid was added. The chlorendic acid was added incrementally over a period of about 20 minutes, while maintaining the temperature at about 150°–160° C. The temperature of the mixture was then raised to about 175° C., the water of esterification being collected. When all the water of esterification had been removed, the mixture was allowed to cool. At about a temperature of 160° C., about 23 grams of ethylene glycol were added. The temperature was maintained at about 160° C. for about one-half hour. The reaction mixture was then thinned with a solvent mixture of 104 ml. of monoethyl ether of ethylene glycol acetate and 330 ml. of Solvesso 100. The product was completely insoluble in V.M.+P. naphtha, as indicated by complete precipitation and phase separation when titrated with less than 50% aliphatic solvent.

Examples 7 to 10[2]

The following carboxylic curing compositions utilizing pentaerythritol, phthalic anhydride, and $C_{16}$ alpha olefin oxide (Nedox 1518) are summarized as follows:

| Ex. | Percent phthalic | Percent pentaerythritol | Percent $C_{16}$ alpha olefin oxide | Acid No. | VM+P soly. | Percent VM+P reducibility |
|---|---|---|---|---|---|---|
| 7 | 60.1 | 12.1 | 27.9 | 145 | No | <50 |
| 8 | 56.1 | 18.0 | 25.9 | 110 | No | <50 |
| 9 | 53.1 | 23.0 | 23.9 | 106 | No | <50 |
| 10 | 50.4 | 28.0 | 21.6 | 105 | No | 50–75 |

All of the above compositions precipitated from V.M.+P. naphtha at 60% concentration. These curing agents were found to cure satisfactorily when catalyzed with phosphoric acid. A particular example showing the teachings of the Coats Pat. No. 3,397,255 was prepared with the following ingredients, which were charged into a flask:

| | Parts |
|---|---|
| Chlorendic anhydride | 60.0 |
| Trimethylol ethane | 13.5 |
| $C_{16}$ alpha olefin oxide (Nedox 1518) | 26.5 |
| Xylene | 10.0 |

The reaction was carried out at 350° F. until an acid value of 14.6 mg. KOH/g. was obtained. This composition was soluble in V.M.+P. naphtha, but it did not function as a carboxyl curing agent, since it did not dry when blended 60/40 with epoxidized soya oil. The blend remained tacky for a period of in excess of two weeks.

[1] This example has been duplicated from U.S. Pat. No. 3,408,215.
[2] These examples have been duplicated from U.S. Pat. No. 3,397,255.

What is claimed is:

1. A carboxylic curing composition obtained by reacting (a) pentaerythritol with (b) more than 60 but less than 85 percent by weight of a dibasic anhydride selected from the group consisting of hexachloroendomethylene tetrahydrophthalic anhydride, chlorendic anhydride, and with (c) an epoxide having at least 10 serially linked carbon atoms containing an average of from about 1 to about 1.5 oxirane rings per molecule and selected from the group consisting of a 15–18 carbon alpha olefin oxide, epoxidized octyl tallate and a glycidyl ester of a branched tertiary carboxylic acid, each reactant being provided in sufficient quantity so that the ratio of equivalents hydroxyl:mols dibasic anhydride:mols epoxide, represented as $E_{OH}/M_A/M_E$, is in the range from about 1:1.15:0.15 to about 1:1.5:0.5, the reaction occurring at a temperature in the range from about 120° to about 200° C. for a period of time sufficient to form said polycarboxylic curing composition with an acid number in the range from about 80 to about 150, characterized by being essentially completely soluble in paraffinic hydrocarbon solvents.

2. The composition of claim 1, including minor quantities of anhydrides selected from the group consisting of trimellitic, naphthenic-2,11, and halogenated derivatives thereof, and maleic, succinic, and alkyl-substituted or halogenated derivatives thereof to an extent not exceeding 10 percent by weight of the total composition.

3. The composition of claim 1, wherein said anhydride is chlorendic anhydride, and said epoxide is a 15–18 carbon alpha olefin oxide in the ratio of $E_{OH}/M_A/M_E$ equal to 1:1.25:0.25.

4. The composition of claim 1 wherein the anhydride is chlorendic anhydride, and said epoxide is a 15–18 carbon alpha olefin oxide in the ratio of $E_{OH}/M_A/M_E$ equal to 1:1.32:0.32.

5. The composition of claim 1, wherein said anhydride is chlorendic anhydride, and said epoxide is epoxidized octyl tallate in the ratio of $E_{OH}/M_A/M_E$ equal to 1:1.25:0.25.

6. The composition of claim 1, wherein said anhydride is chlorendic anhydride, and said epoxide is a glycidyl ester of a branched tertiary carboxylic acid in the ratio of $E_{OH}/M_A/M_E$ equaling 1:1.35:0.31.

7. The composition of claim 1 wherein said anhydride is chlorendic anhydride, and said epoxide is a glycidyl ester of a branched tertiary carboxylic acid in the ratio of $E_{OH}/M_A/M_E$ equal to 1:1.41:0.40.

8. The composition of claim 1, wherein said reaction is carried out in the presence of an inert liquid medium or a solvent for either the reactants or the reaction products, or both.

9. A process for preparing a carboxyl functional curing agent for epoxide resins essentially completely soluble in paraffinic hydrocarbon solvents, comprising heating (a) pentaerythritol and (b) a dibasic anhydride selected from the group consisting of hexachloroendomethylene tetrahydrophthalic anhydride, and chlorendic anhydride and, after partial esterification of said pentaerythritol is complete, adding (c) an epoxide selected from the group consisting of a 15–18 carbon alpha olefin oxide; epoxidized octyl tallate; and a glycidyl ester of a branched tertiary carboxylic acid, and having at least 10 serially linked carbon atoms containing an average of from about 1 to about 1.5 oxirane rings per molecule in the ratio of equivalents hydroxyl:mol dibasic anhydride:mols expoxide, represented as $E_{OH}/M_A/M_E$, in the range from about 1:1.5:0.15 to about 1:1.5:0.5, at a temperature in the range from about 120° to about 200° C., for a period of time sufficient to react substantially all of the oxirane ring-containing compound with the partial ester so as to generate a hydroxyl group on the beta carbon atom of the oxirane ring compound residue, and thereafter further reacting the condensate with an additional quantity of said anhydride so as to react with at least one of said free hydroxyl groups, adding further carboxyl functionality to the condensate.

10. The process of claim 9 wherein said process is carried out in the presence of an inert liquid medium or solvent for either the reactants or the reaction products, or both.

References Cited

UNITED STATES PATENTS

| | | | |
|---|---|---|---|
| 3,397,255 | 8/1968 | Coats et al. | 260—850 |
| 3,050,480 | 8/1962 | Budde | 260—22 |
| 3,089,863 | 5/1963 | Hicks et al. | 260—75 |
| 3,218,274 | 11/1965 | Boller et al. | 260—22 |
| 3,408,215 | 10/1968 | Wismer et al. | 106—252 |

DONALD E. CZAJA, Primary Examiner

R. W. GRIFFIN, Assistant Examiner

U.S. Cl. X.R.

117—132 BE, 161 ZB, 161 K; 260—33.6 EP, 75 EP

UNITED STATES PATENT OFFICE
CERTIFICATE OF CORRECTION

Patent No. 3,699,064     Dated October 17, 1972

Inventor(s) Arthur L. Cunningham

It is certified that error appears in the above-identified patent and that said Letters Patent are hereby corrected as shown below:

Columns 5 and 6, Table I:

Second item under "Weight percent" (third column) should read -- 82.6 -- instead of "68.6";

Third item under "Viscosity (G-H)" (last column) should read -- 16 -- instead of "12";

Fourth item under "Viscosity (G-H)" (last column) should read -- 12 -- instead of "56".

It is noted in Column 2, Line 30, that "not" should read -- note --

Signed and sealed this 20th day of February 1973.

(SEAL)
Attest:

EDWARD M. FLETCHER, JR.
Attesting Officer

ROBERT GOTTSCHALK
Commissioner of Patents